April 18, 1933.  W. T. CARTER  1,903,905
AUTOMOBILE SERVICING MACHINE
Filed July 21, 1931  4 Sheets-Sheet 3
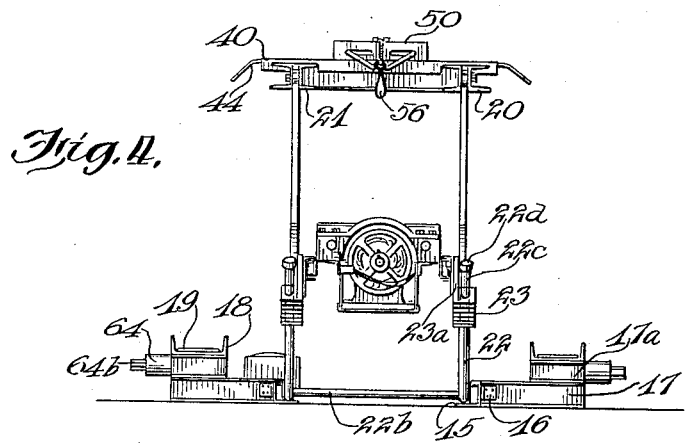
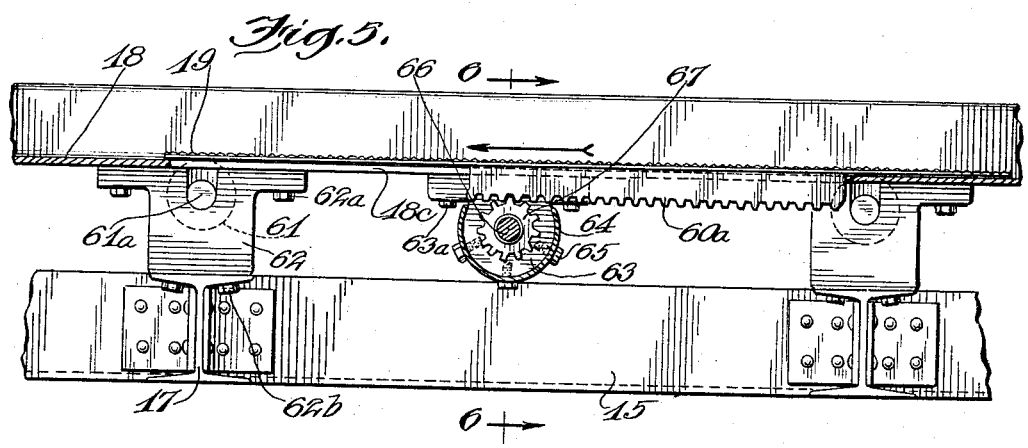
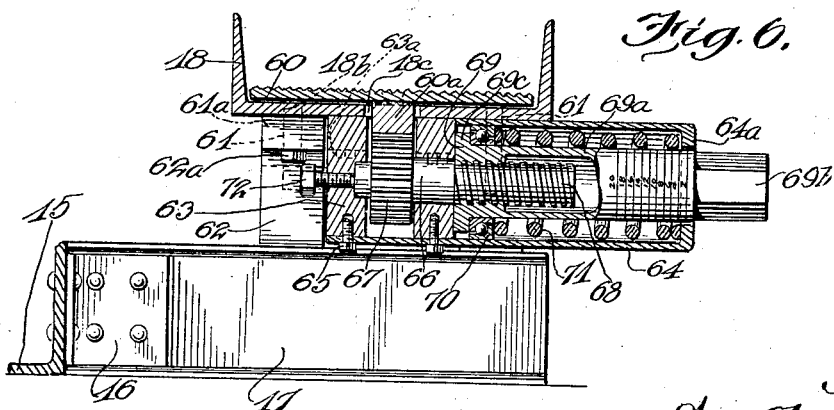
Inventor
Wm. T. Carter
By Stevens + Batchelor
Attys.

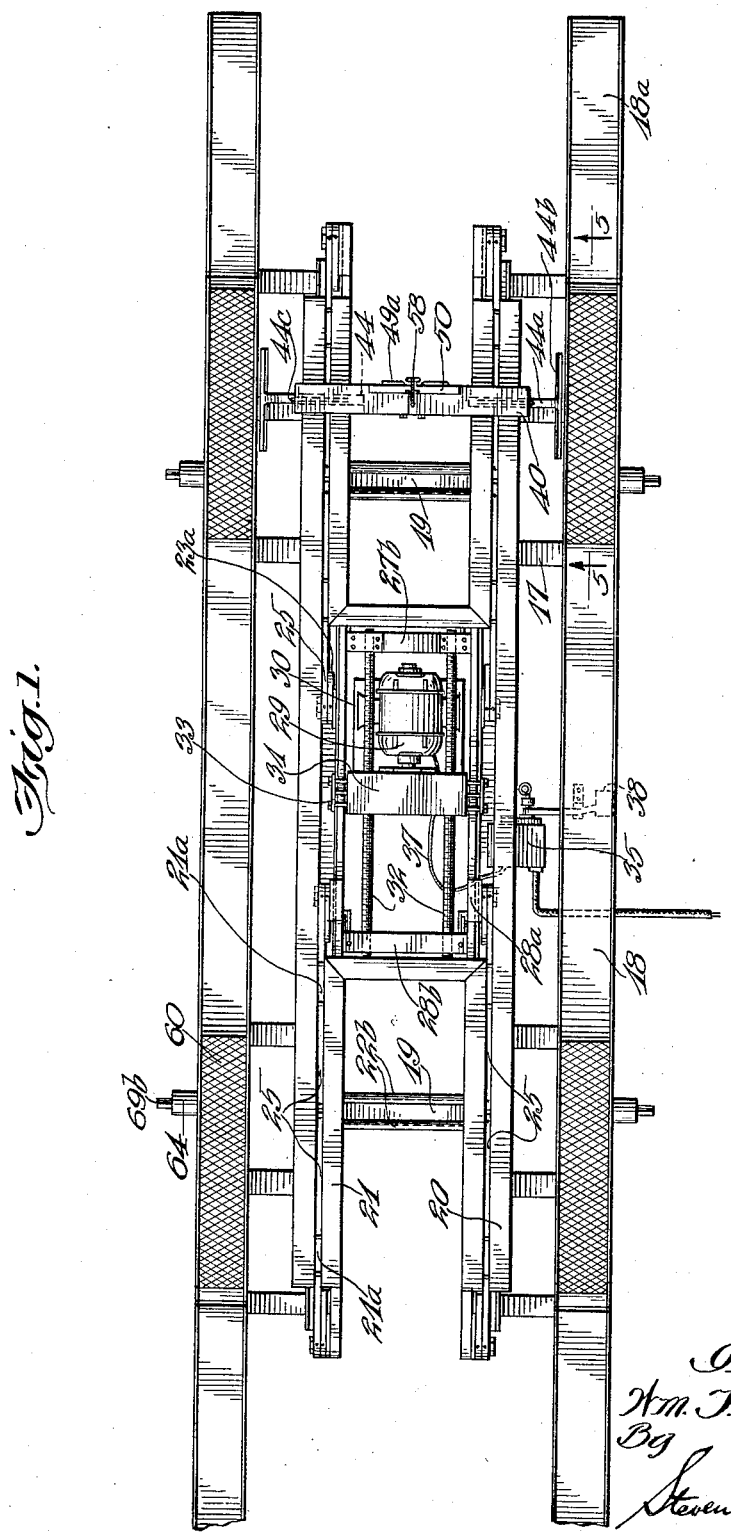

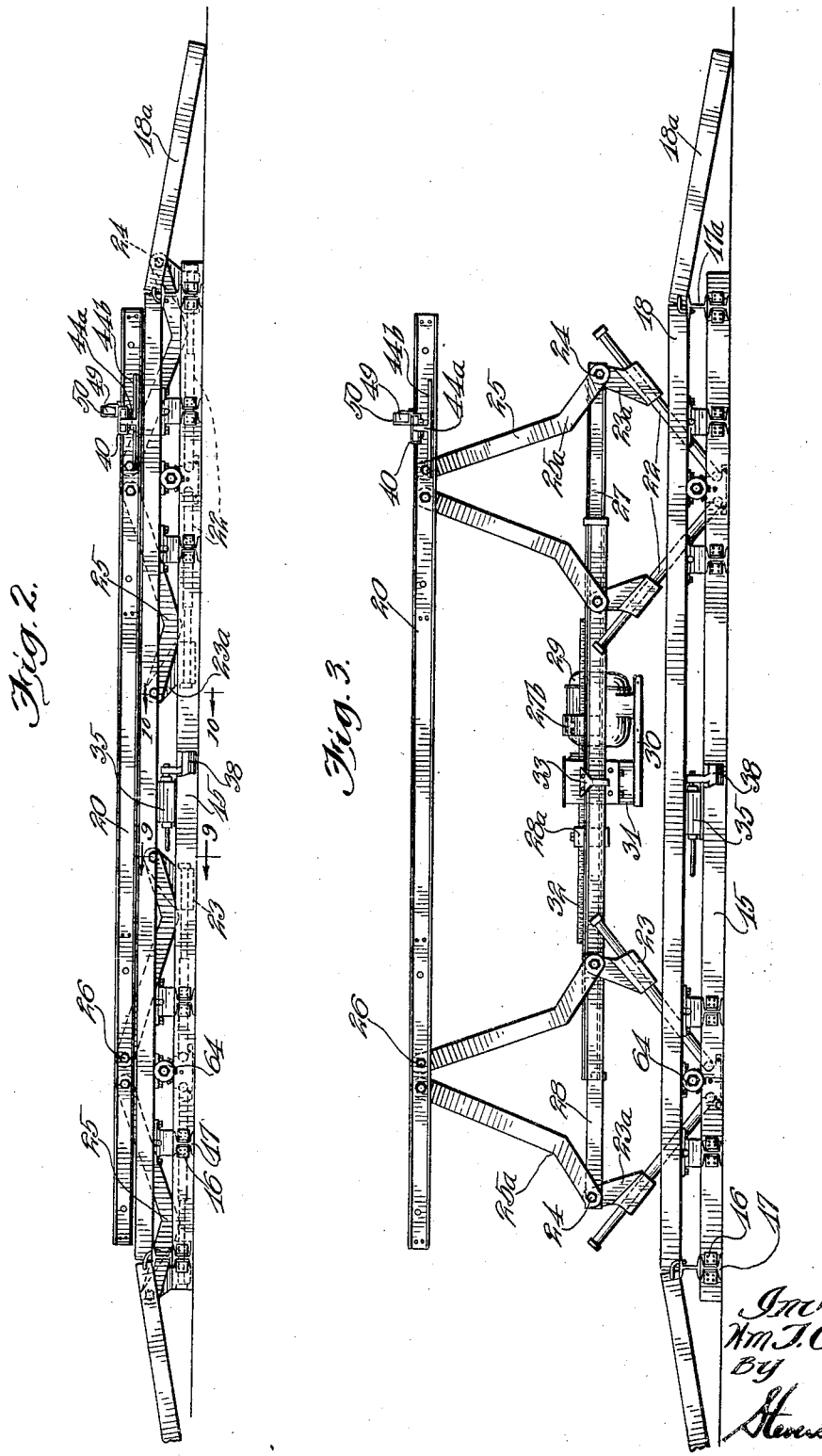

April 18, 1933.    W. T. CARTER    1,903,905
AUTOMOBILE SERVICING MACHINE
Filed July 21, 1931    4 Sheets-Sheet 4
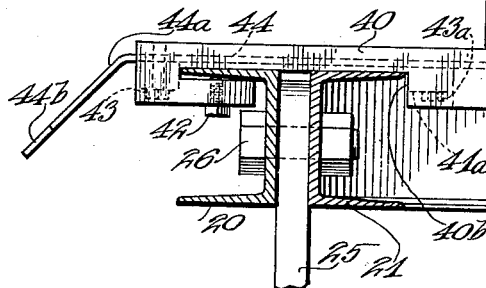
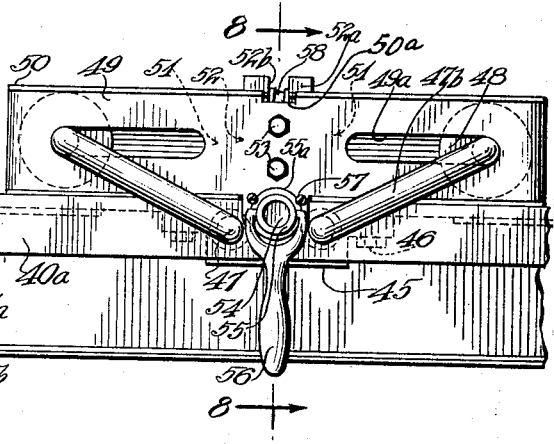
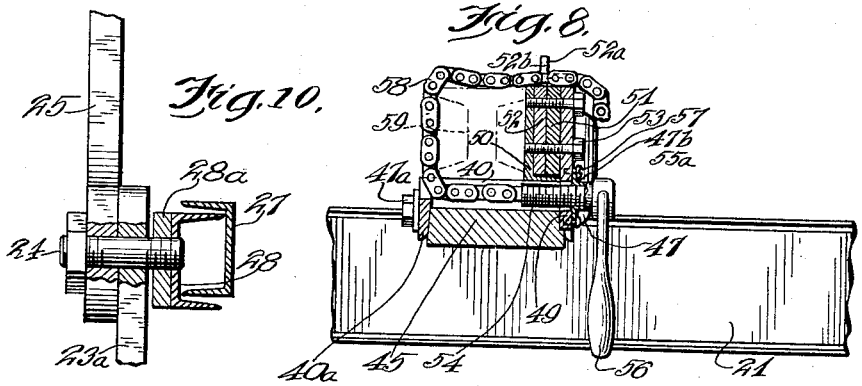
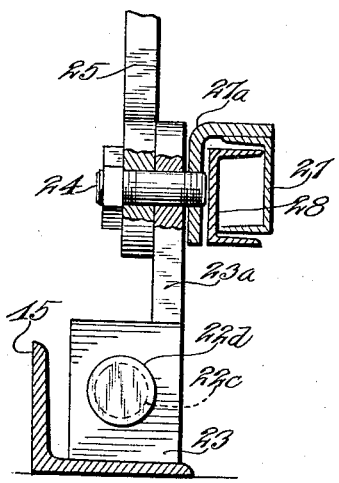
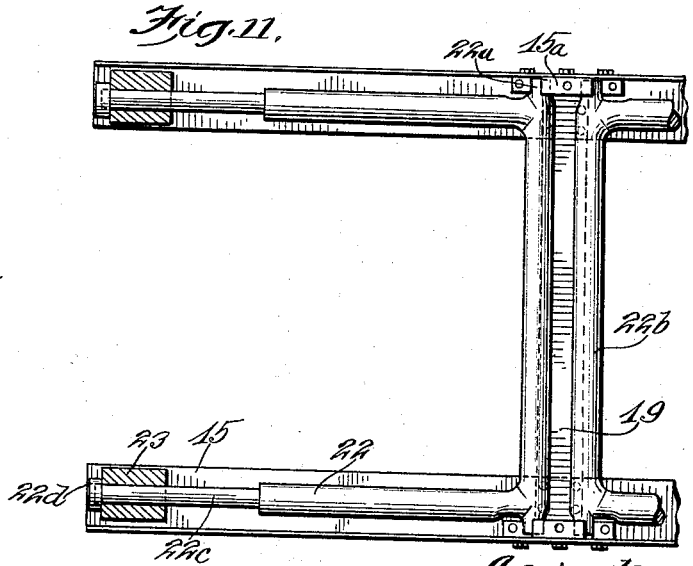
Inventor:
Wm T. Carter
By Stevens & Batchelor Attys.

Patented Apr. 18, 1933

1,903,905

UNITED STATES PATENT OFFICE

WILLIAM T. CARTER, OF CHICAGO, ILLINOIS

AUTOMOBILE SERVICING MACHINE

Application filed July 21, 1931. Serial No. 552,253.

My invention relates to machines for servicing automobiles, and my main object is to provide a machine of this kind which is movable from place to place.

A further object of the invention is to design the novel machine in a self-contained unit which rests on the ground and requires no foundation or means to fasten it to the ground.

A still further object of the invention is to include a simple power plant within the machine, so that only a current or fuel supply connection will be required to put the plant in running order.

A still further object is to construct the novel machine on open lines, for maximum access to the mechanism of the automobile.

Another object of the invention is to procure a lifting operation with a favorable leverage, such leverage being higher during the initial lifting stage, whereby to relieve the power plant of undue strain during such stage.

An additional object of the invention is to include in the apparatus a testing device for wheel alignment.

A significant object of the invention is to include in the apparatus a simple and dependable brake-testing unit.

A final and important object of the invention is to build the novel machine in skeleton style, whereby to give it the utmost simplicity consistent with strength.

With the above objects in view and any others that may suggest themselves from the specification and claims to follow, a better understanding of the invention may be had by reference to the accompanying drawings, in which—

Fig. 1 is a plan view of the novel machine;

Fig. 2 is an elevation thereof in the normal or low position;

Fig. 3 is a similar view in the raised position;

Fig. 4 is an end view, minus terminal approach platforms;

Fig. 5 is an enlarged section taken on the line 5—5 of Fig. 1;

Fig. 6 is a section on the line 6—6 of Fig. 5;

Fig. 7 is a fragmental enlargement of the showing in the upper part of Fig. 4;

Fig. 8 is a detail section taken on the line 8—8 of Fig. 7;

Figs. 9 and 10 are respectively, enlarged sections on the lines 9—9 and 10—10 of Fig. 2; and Fig. 11 is a plan view of a unit involved in the lifting mechanism.

Referring specifically to the drawings, the novel machine is built on elongated foundation composed of two angle rails 15 laid flats-down, facing with their insides, and in parallelism. These rails receive by means of riveted angle plates 16, lateral I-bars 17, upon which duplicate I-bars 17a are mounted for the seating of two upwardly opening channel bars 18, these being on opposite sides of the foundation aforesaid and extending endwise with inclines 18a. The bars 18 are intended to form runways for the wheels of a motor car, the inclines descending to ground level. The base rails 15 are connected across at intervals by bars 19.

The lifting element in my machine operates through the agency of a skeleton top platform directly above and similar to the foundation. This platform comprises parallel and outwardly facing channel bars 20 reinforced and squared on the inside by U-shaped channel frames 21, one at each end, as clearly shown in Fig. 1, spacing blocks 21a being inserted between the sides of the U-frames and the respective bars 20 to slightly separate the latter from the frames. The layout of the bars and frames is so designed that their assembly may conveniently receive the frame of a motor car for the lifting of the latter. Also, the top platform has a clear opening except for the cross bars of the U-frames, allowing free access from below to the mechanism of the car.

For the raising and lowering of the top platform relative to the foundation, two folding units of like construction are interposed in the ends of the machine. Each unit is mainly composed of similar and laterally-spaced sections, and these function as compound lifting links.

The arrangement of the lifting links in each folding unit originates with a pair of U-arms 22 laid inside of the foundation rails 15. The latter are made with bearings 15a to receive trunnions 22a extended endwise from the base 22b of each U-arm 22, whereby to render the latter rockable on such base. As shown in Fig. 11, the bases of each pair of arms are closely grouped; and the arms extend outwardly, being formed with reduced portions 22c terminating with caps 22d.

Along the reduced portions 22c of the U-arms 22 are slidable blocks 23 which are upwardly extended with wings 23a. These receive bolts 24 to make a pivotal connection with the lower ends of a pair of links 25, which rise convergently to terminate in close order within the spaces between the channel frames 21 and the bars 20, receiving cross-bolts 26 through these to become pivoted to the top platform. The lower portions of the links receive inward breaks 25a for a purpose to be made clear in a later section.

Between the top platform and the foundation of the machine is a telescoping frame assembly containing—and operated by—a power plant, such as an electric or pressure motor. The assembly includes essentially a pair of channel bars 27 and 28 at each side of a medially located motor 29. The bars 27 face outwardly, and the bars 28 inwardly and are meshed with the bars 27 overlappingly (see Figs. 9 and 10) or otherwise to dispose the bars for smooth telescopic action.

The bolts 24 of the left-hand block wings 23a are screwed inwardly and directly into the channel bars 28 as reinforced by side blocks 28a. The bolts of the right-hand wings are however secured to brackets 27a carried by the bars 27 and overhanging the bars 28 as clearly shown in Fig. 9.

Within the telescoping frame, the motor 29 is carried on a base 30 extended from a gear box 31. In the latter a suitable gearing reduces the speed of the motor drive and transmits the same to two shafts which extend from the box to form long screws 32. Both shafts are geared to turn in the same direction, but the screw sections on the right-hand side of the gear box have right-hand threads while the other sections have left-hand threads. The right-hand screws thread into a cross-head 27b carried transversely by the telescopic bars 27; and the left-hand screws do the same with reference to a cross head 28b carried by the bars 28.

By means of the screws 32, the motor and its gear box float between the cross-heads 27b and 28b. However, the screws do not solely support the floating assembly, means for this purpose being carried by the gear box in the form of bolted bearing straps 33 which slidably receive the telescopic bar assemblies (27, 28) on each side. Now, when the motor runs, the action of the screws will gather or separate the cross-heads—depending on the direction of rotation—procuring the telescopic movement of the bars to lengthen or shorten their span, the bars simply sliding through the bearings 33 while serving as medial supports for the power plant.

In a machine of this kind it is essential to design the lifting element to have the lowest practicable initial position, in order that a motor car may surmount such element while on the ground or slightly above the same. I have accomplished such a design in my machine, since the runways 18 need be but a few inches above the ground to place the motor car at a sufficient height to amply clear the lifting element.

The machine in collapsed form appears as in Fig. 2, the lower portion of the links 25 resting on the blocks 23. While these portions indicate by their lowermost positions that the lowest possible limit has been reached by the links, it is sufficient that the upper portions of these rise at a significant angle to give their upper ends quite some height above the line of the bolts 24. Thus, when the telescopic bars gather, the broken or obtuse form of the links enables the upper portions of these to rise quite readily, thus obviating the difficulty of a dead-center. It is evident that straight links at the angle of lowermost position would also procure a lifting action when the telescopic movement is started, but it will be appreciated that the effort to procure this action would have to be greater because of the near approach of the link angle to a dead-center. It may thus be safely assumed that the action of the novel links as previously mentioned will operate to lift the top frame from the telescoping frame assembly as high as will correspond to a given contracting movement of such assembly.

The action just described lifts only the load carried on the top platform, since the telescoping frame assembly still rests at the initial or low position. For this reason, it is apparent that the motor 29 has only expended enough energy to lift the load and not the additional energy that would be required to also lift the power weighted telescoping frame assembly, this operation indicating that the initial load upon the motor is only partial and therefore imposes no strain upon the latter when starting.

During the gathering action of the links described above, the blocks 23 have merely approached each other, sliding on the U-arms 22. By the time the blocks have reached the inner shoulders of the reduced portions 22c, it would seem that the said contraction of the links would bind on such shoulders, but such contraction takes advantage of the angle between the base 22b of each U-arm 22 and the link pivot 24, which gives the links enough purchase to draw up on the U-arms as the contracting movement ensues. It follows that the rise of the U-arms must lift the combination of the telescoping bar assembly and the top platform, so that eventually the position of the machine will be as indicated in Figure 3. It will be seen that the power plant was bodily lifted during the latter operation, and may by suitable switch means procure its own shut-off when a predetermined height of the top platform has been reached.

It will be seen that the function of the electrical power plant with its gear box and screws is purely to gather and separate the cross heads 27b and 28b. Therefore, it is easily conceivable that a pneumatic or other type of pressure power plant may be substituted for the electrical one without undue skill to perform the same function as far as the cross heads are concerned, and it is therefore not necessary for me to illustrate or describe this alternative.

In employing the novel machine for the front wheel alignment or brake testing functions, a unit must be had which secures the motor car against slipping or creeping motion. In the present embodiment such a unit originates with a cross channel bar 40 which spans the top platform as shown in Fig. 1 near one end of the machine, the section in Fig. 7 showing the cross channel bar in elevation and more clearly. It is here seen—and also in Fig. 8—that this bar opens downwardly and that its flanges 40a have undercut slots 40b to straddle the top channel assembly 20, 21. Each end of the channel bar 40 is filled by a block 41 thereby to form a bearing for a set screw 42 which secures the assembly of the block and the channel bar to the top platform channel bar 20. The block itself is secured by a bolt 43 driven through the block into the top of the channel bar. On the inner side of the channel assembly 20, 21 the channel bar 40 receives a block 41a similar to the block 41, and secured in the same manner by a bolt 43a. The blocks 41 and 41a are recessed in the top as suggested in Fig. 2, to permit the slidable passage of a long metal strip 44 which receives an inclined bend 44a outside the channel bar 40 and terminates with side branches 44b in the manner of a T, as more clearly shown in Fig. 2. The strips 44 occur at both sides of the machine and may be drawn out as desired to render their outer ends or heads as guides for the alignment of the motor car wheels. As indicated in Fig. 1, the strips 44 are longitudinally slotted 44c in order to clear the bolts 43 and 43a.

The cross channel bar 40 also receives a medial block 45 by means of bolts 46 to form a bearing for companion cross bolts 47 extending through the bar to the rear to receive nuts 47a. The bolts 47 take frontal bends 47b which rise at a low angle as clearly indicated in Fig. 7 to terminate with rearward studs carrying freely mounted rollers 48. The studs enter horizontal slots 49a made in a plate 49 positioned above the cross channel bar 40, and forming the frontal closure of a channel member 50. In order that the rollers 48 may have sufficient clearance within the latter for horizontal travel, the medial portion of the channel member 50 receives a frontal spacing plate 51 and a rear spacing plate 52, these plates being connected to the channel member and its plate 49 by cross bolts 53. The top of the channel member 50 is slightly cut down as indicated at 50a and the spacer plate 52 is vertically extended as indicated at 52a and divided medially as indicated at 52b.

Below the bolts 53 the plate 49 is perforated for the passage of a screw 54 which receives a frontal nut 55 having a pivoted handle 56. The nut is extended on the face of the plate 49 with a circular flange 55a which is held to the plate by the heads of two small screws 57 driven into the plate 49. The screw 54 is intended to travel as the nut 55 is turned by means of the handle, but the retainer feature of the screws 57 upon the nut flange 55a is provided to keep the nut from falling away in case the screw 54 has departed entirely therefrom. The inner end of the screw 54 is extended with a chain 58 which is adapted to be wrapped over the front axle 59 of the motor car—indicated by dotted lines in Fig. 8—and passed between the extensions 52a of the spacer plate 52. The pins of the chain links are of such length as to prevent the withdrawal of the chain in a rearward direction as it lies in the recess 52b. Therefore, when the nut 55 is turned to draw upon the screw 54, the grip of the chain will be tightened about the axle 59 whereby to secure the same to the cross channel bar 40. In this connection, it will be recalled that the frame of the motor car, rests on the top platform. Relative to such frame, the front axle may be higher or lower according to the make of the car and it is for this reason that I have provided the members 47b which act as links to enable the assembly of the channel member 50 to be lifted by hand to the height of the particular motor car axle involved, so as to easily place such assembly in front of the axle and enable the chain to be wrapped over the axle and the fastening made without delay.

The securing device just described applies more particularly to the front axle of the motor car and indicates that the latter has been run from the left to the right according to Figs. 2 and 3 whereby to have its forward end over the securing device. It will, however, be evident that the latter could be located at the opposite end of the machine if desired.

Relative to the brake testing equipment of the machine, it is necessary that four zones be provided in order to accommodate the 4-wheel brake system now in vogue. These zones are defined in Fig. 1 by platforms 60 laid in the runways 18 and having the top surfaces scored or otherwise roughened as indicated for a good frictional engagement with the tires of the car. The platforms are not in frictional contact with the floors of the runways but are intended to slide over the same by riding over rollers 61 as indicated in Figs. 5 and 6. These rollers pass through longitudinal slots 18b cut in the floors of the runways 18 to receive the platforms, the rollers being carried by spindles 61a which are journaled in bearing blocks 62 located between the runways and the foundation. The bearing blocks are sunken to accommodate the rollers and are secured to the runways by bolts 62a and to proper ones of the lateral I-bars 17 by bolts 62b. Each platform 60 is formed with a longitudinal gear rack 60a depending through a medial slot 18c of the runway 18.

On both sides of each gear rack 60a, the runway receives a bearing 63 secured to the runway by bolts 63a. The bearings are for the most part circular and receive a housing 64 by means of bolts 65, the housing being extended outwardly of the machine as indicated in Figs. 1, 4 and 6. The bearings 63 receive a horizontal shaft 66 which is formed between the bearings with a spur gear 67, the latter being in mesh with the gear rack 60a. Outwardly of the machine, the shaft 66 is formed with an elongated screw 68 upon which is mounted a nut 69 which is extended outwardly of the machine in the form of a tube 69a, terminating beyond the housing 64 with a reduction 69b which is angular in form for the application of a wrench to turn the nut 69. The latter is made at its origin with a radial flange 69c on the outer side of which is a ball thrust bearing 70. Beyond this bearing is a stout coil spring 71, whose turns are spaced and extend along the tubular portion 69a of the nut to terminate against an inward flange 64a of the housing 64. The external surface of the nut portion 69a is graduated in a longitudinal direction and with a scale of legends progressing inwardly of said portion. The inner bearing 63 receives a set screw 72 made with a pointed shank seating in the center of the corresponding end of the shaft 66, as clearly shown in Fig. 6. This set screw is intended as an end-thrust bearing against tendencies for the shaft 66 to frictionally press the gear 67 into engagement with the inner bearing 63 and so retard the motion of said gear.

My method of testing the brakes deals with the resistance offered by the particular wheel tested after its brake has been set or locked. My testing device is designed to impose a rotative stress of gradually increasing force upon the wheel until the wheel is made to move despite its set or locked position, the stress being measured to indicate the number of pounds that are required to overcome the effect of the brakes. Thus, the force which each brake exerts on its wheel is determined.

In carrying out the above analysis, let it be assumed that the brake of the wheel resting on a given platform 60 has been set or locked. A wrench is now applied to the extension or stem 69b of the brake tester and the same turned in a direction to withdraw the nut 69. As the condition of the car wheel holds the gear 67 in a fixed position, the nut 69 will recede against the tension of the spring 71 as the stem 69b is turned. However, as this action continues, the force of the spring 71 will increase the frictional engagement of the nut 69 with the threads of the screw 68, exerting an influence upon the latter to turn with the nut. This influence increases until it becomes stronger than the power which holds the wheel set or locked, so that the wheel is forced to turn. At the inception of this turning movement the turning of the stem 69b may be stopped. Now, the nut portion 69a has emerged so far from the housing 64 as to disclose a scale reading of the number of pounds which it is calculated the brake exerts upon the wheel. Obviously, if the reading is high, then the brake is in good order; on the other hand if the wheel begins to turn at an early stage of the test, the brake has a poor hold and must be adjusted until a test shows the hold to have improved to the proper degree.

It will be seen that the novel machine accomplishes an important service to the motor car. It procures the lifting thereof if necessary for repair or greasing the car, easy access from below on account of the open top platform on which the car is carried. On the other hand, if only wheel alignment or brake testing is necessary, the lifting or lowering operations may or may not be necessary. The power plant is centralized to such a compact and self-contained degree that it may be used in one or another form such as the electric, pneumatic or hydraulic type without any alteration or change in the general design of the machine. Finally, it is clear that the machine is of a skeleton type and so squared up by its internal frame works, such as the structures 21 and 22 that without the use of a ground foundation it is proof against side sway, vibration or collapse.

I claim:—

1. A lifting mechanism comprising a horizontal frame made up of telescoping units, a platform above the frame and adapted to receive a load, a base below the frame, connections between the units of the latter and the platform to raise and lower the latter by the telescopic action of the units, and connections between the latter and the base to raise and lower the frame and its superstructure from the base during such telescopic action.

2. The structure of claim 1, and means in the second-mentioned connections rendering them inoperative during the initial period of the inward telescopic action of the units.

3. A lifting mechanism comprising a horizontal frame made up of telescoping units, a base below the frame, arms pivoted at one of their ends in the base and laid in the latter, blocks slidable along the outer portions of the arms, and connecting pivotally with the respective frame units, such blocks operating to swing the arms up from the base and raise the frame when the gathering movement of the units continues after the blocks reach their inward sliding limits.

4. The structure of claim 3, and wings upwardly extended from the blocks to make said pivotal connections and place them at a sufficient height to avoid dead center resistance when the arms are swung.

5. A lifting mechanism comprising a horizontal frame made up of telescoping units, links rising convergently from the latter, a platform carried by the upper portions of the links and adapted for receiving a load, the telescoping action of the units operating to raise the platform by the gathering movement of the links, the platform comprising a pair of longitudinal side bars, rectangular reinforcing frames between the latter and with their lateral portions spaced from said sides, means for fixing said spaced relation, the upper ends of the links entering the spaces involved, and pivots connecting such ends with said lateral portions and sides.

6. A lifting mechanism comprising an elongated horizontal frame made up of longitudinally-telescoping units, a pair of links rising convergently from each end portion of the frame, the links of each pair originating from the respective units, a platform carried by the upper portions of the links and adapted for receiving a load, the telescoping action of the units operating to raise the platform by the gathering movement of the links, a power plant amidships of the frame, crossheads carried by the frame units on opposite sides of the power plant, and connections between the latter and the respective crossheads to gather and separate them and procure the telescopic operation of the frame units.

7. A lifting mechanism comprising an elongated horizontal frame made up of longitudinally-telescoping units, a pair of links rising convergently from each end portion of the frame, the links of each pair originating from the respective units, a platform carried by the upper portions of the links and adapted for receiving a load, the telescoping action of the units operating to raise the platform by the gathering movement of the links, a power plant amidships of the frame, crossheads carried by the frame units on opposite sides of the power plant, and screw-shafts extending from the latter and threading through the respective crossheads to gather and separate them as traveling nuts and procure the telescopic operation of the frame units.

8. A lifting mechanism comprising a horizontal frame made up of telescoping units, links rising convergently from the latter, and a platform carried by the upper portions of the links and adapted for receiving a load, the telescoping action of the units operating to raise the platform by the gathering movement of the links, and the latter having inward breaks near their lower ends, whereby to place their upper portions at steeper inclinations when the telescoping units are spread and so cause the links to depart from dead-center resistance when the units gather.

In testimony whereof I affix my signature.

WILLIAM T. CARTER.